(12) United States Patent
Brand et al.

(10) Patent No.: US 9,416,695 B2
(45) Date of Patent: Aug. 16, 2016

(54) NON-RETURN VALVE FOR AN OIL RETURN IN THE CRANKCASE VENTILATION SYSTEM OF A COMBUSTION ENGINE

(71) Applicant: DICHTUNGSTECHNIK G. BRUSS GMBH & CO. KG, Hoisdorf (DE)

(72) Inventors: Manfred Brand, Tremsbuettel (DE); Doerte Petigk, Hoisdorf (DE); Thomas Schrader, Hamburg (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 14/315,112

(22) Filed: Jun. 25, 2014

(65) Prior Publication Data

US 2014/0373797 A1    Dec. 25, 2014

(30) Foreign Application Priority Data

Jun. 25, 2013 (DE) .......................... 10 2013 212 104

(51) Int. Cl.
 *F01M 3/04* (2006.01)
 *F02F 7/00* (2006.01)
 *F01M 13/04* (2006.01)
 *F01M 11/02* (2006.01)
 *F16K 15/04* (2006.01)

(52) U.S. Cl.
 CPC ............... *F01M 3/04* (2013.01); *F01M 11/02* (2013.01); *F01M 13/04* (2013.01); *F01M 13/0405* (2013.01); *F02F 7/006* (2013.01); *F16K 15/04* (2013.01); *F01M 2013/0494* (2013.01); *Y10T 137/7904* (2015.04)

(58) Field of Classification Search
 CPC .. F01M 3/04; F01M 2013/0494; F16K 15/04; Y10T 137/7873; Y10T 137/791
 USPC ............... 137/533.11, 519.5; 123/188.1
 See application file for complete search history.

(56) References Cited

U.S. PATENT DOCUMENTS

| | | | |
|---|---|---|---|
| 3,765,386 A | 10/1973 | Ottofy | |
| 3,941,145 A * | 3/1976 | Morain | F16K 17/34 137/318 |
| 4,602,595 A | 7/1986 | Aoki et al. | |
| 4,637,426 A * | 1/1987 | Lyon | F16K 15/04 137/433 |
| 6,684,864 B1 | 2/2004 | Busen et al. | |
| 7,080,636 B2 | 7/2006 | Knaus et al. | |
| 7,137,372 B2 | 11/2006 | Hilpert et al. | |

(Continued)

FOREIGN PATENT DOCUMENTS

| | | |
|---|---|---|
| AU | 2002301037 | 6/2003 |
| DE | 296 05 425 | 3/1996 |

(Continued)

*Primary Examiner* — Kevin Murphy
*Assistant Examiner* — Nicole Wentlandt
(74) *Attorney, Agent, or Firm* — Saliwanchik, Lloyd & Eisenschenk

(57) ABSTRACT

A non-return valve for an oil return in the crankcase ventilation system of a combustion engine includes a valve housing, a valve body which is mounted in the valve housing so as to be displaceable as a whole between an open position and a closed position, wherein the valve body in the non-operating state of the combustion engine is maintained in the open position without preload and the valve body is configured to automatically move to the closed position in case of an overpressure at the crankcase side with respect to the oil separator chamber. The non-return valve is provided and configured to be inserted into a mounting of a cylinder head cover of the combustion engine.

20 Claims, 6 Drawing Sheets

(56) References Cited

U.S. PATENT DOCUMENTS

| | | | |
|---|---|---|---|
| 7,823,695 | B2 | 11/2010 | Rosendahl et al. |
| 7,842,115 | B2 | 11/2010 | Brand et al. |
| 8,267,071 | B2 | 9/2012 | Janssen et al. |
| 2002/0066424 | A1 | 6/2002 | Fedorowicz et al. |
| 2008/0196364 | A1 | 8/2008 | Brand et al. |
| 2009/0263261 | A1 | 10/2009 | Hoffmann et al. |

FOREIGN PATENT DOCUMENTS

| | | |
|---|---|---|
| DE | 195 15 482 | 10/1996 |
| DE | 42 14 324 | 4/1998 |
| DE | 198 13 702 | 8/1999 |
| DE | 202 17 601 | 5/2004 |
| DE | 20 2004 004 802 | 7/2004 |
| DE | 20 2004 004 803 | 8/2004 |
| DE | 203 02 911 | 8/2004 |
| DE | 10 2004 002 310 | 8/2005 |
| DE | 10 2004 006 082 | 8/2005 |
| DE | 10 2004 018 567 | 12/2005 |
| DE | 10 2004 061 938 | 6/2006 |
| DE | 20 2007 011 585 | 11/2007 |
| DE | 10 2006 038 700 | 2/2008 |
| DE | 10 2007 058 059 | 8/2008 |
| DE | 10 2007 008 672 | 9/2008 |
| DE | 196 28 812 | 1/2009 |
| DE | 10 2008 030 134 | 2/2009 |
| DE | 20 2008 002 928 | 8/2009 |
| DE | 10 2008 019 293 | 10/2009 |
| EP | 1 090 210 | 4/2000 |
| EP | 1147992 | 10/2001 |
| EP | 1 614 871 | 7/2005 |
| EP | 1559876 | 8/2005 |
| FR | 2932843 | 12/2002 |
| JP | 2002-322944 | 11/2002 |
| WO | WO-98/32955 | 7/1998 |
| WO | WO-2004/090292 | 10/2004 |

* cited by examiner

NON-RETURN VALVE FOR AN OIL RETURN IN THE CRANKCASE VENTILATION SYSTEM OF A COMBUSTION ENGINE

RELATED APPLICATION

The application claims priority under 35 U.S.C. §119(e) of German Patent Application No. DE 10 2013 212 104.0, filed on Jun. 25, 2013, which is hereby incorporated by reference in its entirety.

BACKGROUND OF INVENTION

The invention relates to a non-return valve for an oil return in the crankcase ventilation system of a combustion engine, including a valve housing and a valve body which is mounted in the valve housing so as to be displaceable between an open position and a closed position, the valve body in the non-operating state of the combustion engine being maintained in the open position without preload and being configured to automatically move to the closed position in case of an overpressure at the crankcase side with respect to the oil separator chamber.

To reliably prevent the ingress of oil from the crankcase through the oil return into the cleanroom of the oil separator, and thus into the intake section, conventionally for example a siphon is arranged in the oil return, see DE 198 13 702 C1; DE 20 2004 004 803 U1, FIG. 7; DE 10 2004 006 082 A1. As at any time there is some oil in the siphon, the oil return runs the risk to freeze and consequently to become inoperative. The same applies to the embodiment according to FIG. 13 of DE 20 2004 004 803 U1, in which a sintered body is arranged in the oil return.

In addition, non-return valves are commonly known for the oil return of an oil separator in the crankcase ventilation system of a combustion engine.

Common types of non-return valves for example comprise an umbrella-shaped or plate-shaped elastomer body which in the neutral position of the engine is in the closed position, and which in case of a low pressure in the crankcase and/or at a predetermined level in an oil reservoir opens automatically, see U.S. Pat. No. 4,602,595; WO 98 32955 A1; DE 10 2004 002 310 A1; DE 20 2004 004 803 U1, FIG. 14; WO 2004 090292 A2. This non-generic design runs the risk to freeze in the non-operating state of the engine, as the oil cannot discharge.

The like applies to conventional flexible-tongue valves which in the neutral position of the engine are in the closed position, and which in case of a low pressure in the crankcase and/or at a predetermined level in an oil reservoir open automatically, see DE 10 2004 061 938 B3; EP 1 614 871 A2; DE 10 2006 038 700 A1, FIG. 4; DE 10 2008 030 134 A1; DE 10 2007 058 059 A1; DE 10 2007 008 672 A1; DE 10 2008 019 293 A1.

The spring diaphragm according to DE 296 05 425 U1 in the unloaded state owing to its own weight in fact is in an open position. However, the spring diaphragm in the open position hangs down loose so that the open position is not well-defined. For example, the flexible tongue cannot be prevented from sagging due to aging or high stress, being a potential risk to the operational capability of the non-return valve.

DE 20 2007 011 585 U1 discloses an oil return valve comprising a floating body located in a housing, which being subject to buoyant lift uncovers a discharge opening in the housing when a defined oil level is exceeded, and which being subject to gravity covers said opening when the oil level falls below a defined oil level.

EP 1 090 210 B1 discloses a cyclone separator comprising a valve ball arranged in the oil return, which being subject to gravity in the non-operating state of the engine closes the oil return.

All of the above-mentioned non-return valves have in common that in the non-operating state of the engine they do not provide the maximum opening diameter, being detrimental to the freezing behavior.

Another likewise non-generic design provides a controlled non-return valve which is opened in a pilot-operated manner by use of external power, for example compressed air or magnetic force, see DE 195 15 482 A1; DE 202 17 601 U1; DE 203 02 911 U1; DE 10 2004 018 567 B3. However, the realization of such pilot-operated valves is very complex. The same applies to flexible-tongue valves controlled by a pump according to DE 20 2004 004 802 U1 and DE 10 2008 019 293 A1.

A generic oil return non-return valve is known from DE 196 28 812 B4. The non-return valve includes a housing and a valve body which is mounted within the housing so as to be movable as a whole, the valve body in the non-operating state of the engine uncovering a maximum opening diameter, and during operation in case of an overpressure in the crankcase being lifted relative to the oil separator covering a through opening. This valve is inserted into a mounting of the crankcase, and there are provided circumferential sealing lips around the outer circumference of the valve housing having an outer diameter that is slightly larger than the diameter of the mounting so that the housing can be fittingly inserted into the mounting with frictional contact performing a sealing function and being adjustable. However, depending on the mounting position it is difficult to find a place for the non-return valve in the crankcase. Furthermore, the non-return valve for the engine manufacturer is an additional component to be mounted. Removing the non-return valve from the crankcase in the event of malfunction or failure, after all, involves great effort.

BRIEF SUMMARY

It is the object of the invention to provide a non-return valve that does not impose any special requirements on the engine manufacturer and, if necessary, can be removed with relatively small effort.

The invention solves this object with the features of the independent claims. According to the invention, the non-return valve is provided and configured to be inserted into a cylinder head cover of the combustion engine so that no requirements need to be imposed on the engine manufacturer, as the non-return valve is mounted already when the cylinder head cover is produced and is delivered together with the cylinder head cover. In the event of malfunction or failure, the non-return valve can be removed from the cylinder head cover with essentially less effort or can be replaced together with the entire cylinder head cover.

DETAILED DISCLOSURE

According to the invention, in the non-operating state of the combustion engine the valve body in particular being subject to gravity is maintained in the open position without preload. As a result of omitting a compressive spring for the valve body, the same can be moved quickly from the open position to the closed position. Even if there are only minor differences in pressure, the valve body is moved to the closed position and prevents the ingress of oil-loaded gas from the crankcase into the cleanroom of the oil separator.

The open position and closed position of the valve is realized solely by displacing the valve body as a whole. "As a whole" means that all parts fixedly connected to the valve body are displaced altogether. In particular, the flow diameter can be opened and closed without a deformation of the valve body, as is the case for example with conventional umbrella valves. Thus, a deformation-induced deterioration is avoided.

In an advantageous embodiment, the valve housing comprises threaded means, in particular a thread, for being screwed into the mounting of the cylinder head cover. Other attachments are possible. Alternatively, it may be possible to fittingly insert the valve housing into the cylinder head cover enabling a particularly quick mounting.

Preferably, a latch means acting between the valve body and the valve housing is provided to prevent the valve from unintentionally getting detached during operation. Alternatively, a securing means may be provided on a component of the cylinder head cover, which, when the component is mounted, is located relative to the valve housing such that upon a detaching movement of the valve housing the same abuts against the securing means. In particular when the valve housing can be fittingly inserted into the mounting, alternatively a clamping connection can be provided between the valve housing and the mounting.

The valve body preferably is ball-shaped or spherical. Compared to a valve body that at least in sections has a cylindrical shape, the installation height of the valve thus can be reduced, if necessary. Ball-shaped is to be taken generally and includes for example also ellipsoid-shaped or ovoid-shaped.

In the following, the invention will be described in detail on the basis of preferred embodiments with reference to the accompanying figures.

Figure 1:
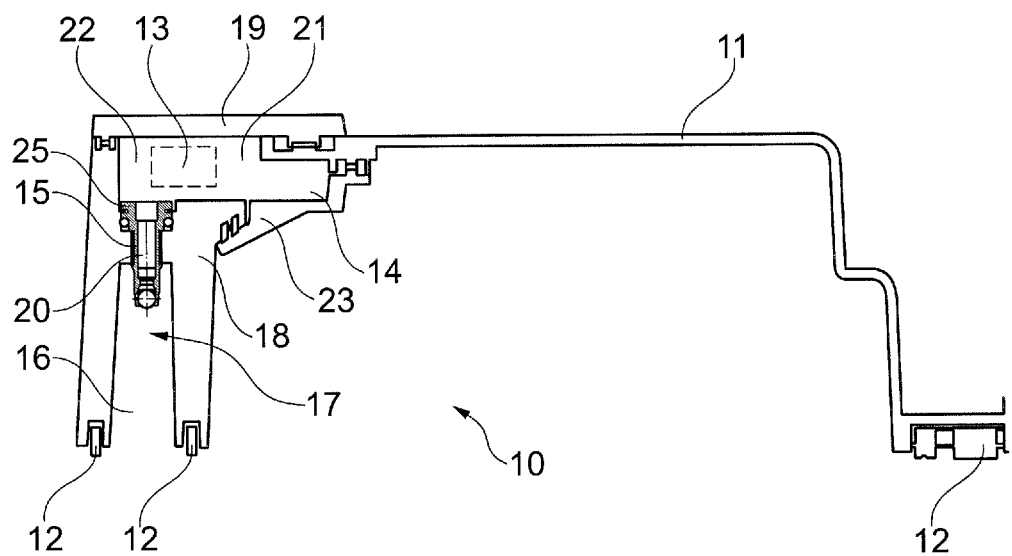
FIG. 1 shows a cross-sectional view through a cylinder head cover.

The cylinder head cover 10 shown in FIG. 1 in cross-sectional view comprises a housing 11 which for example is made of thermoplastic and can be connected to the cylinder head of a combustion engine via sealing elements 12. An only schematically shown oil separator 13, into which blow-by gases are fed from the crankcase of the combustion engine via a gas inlet, is located in an oil separator chamber 22 of the cylinder head cover 10. The cleaned gas via a gas outlet comes from the oil separator 13 into a cleanroom 21 in the cylinder head cover 10, and from there for example is fed into the intake section of the combustion engine. The separated oil can be accumulated in an accumulation chamber 14 and via an oil return 17 is fed back into the oil pan of the crankcase. The oil return 17 includes an oil discharge opening 15 in a housing part 18. In this embodiment, the oil separator chamber 22 during operation is closed by a lid 19. The lid 19 for example can be made of thermoplastic and can be welded to the housing 11. Other attachments, for example by use of screws, are possible. Oil separator chamber 22, oil accumulation chamber 14 and cleanroom 21, as shown in FIG. 1, can be formed by a single closed functional chamber in the cylinder head cover 10, which in this embodiment is enclosed by the housing 11, housing parts 18, 23 and the lid 19.

Figure 2:
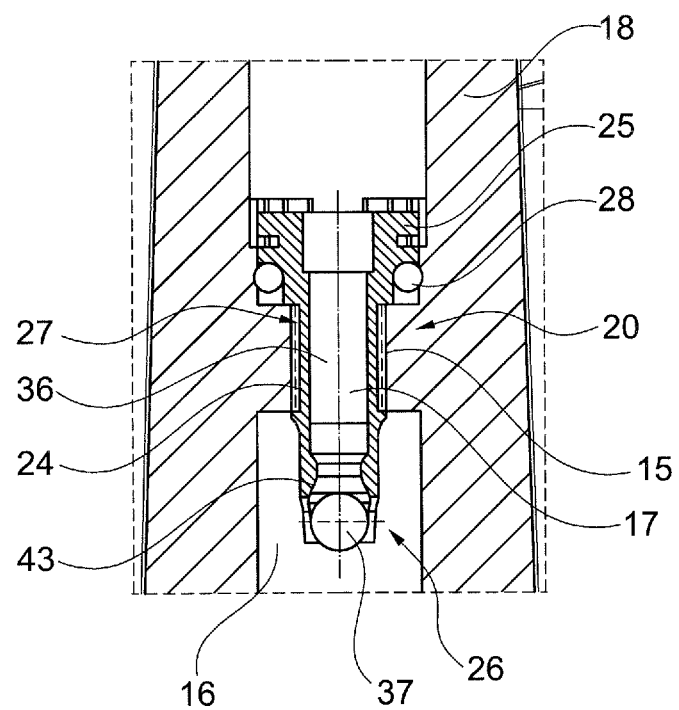
FIG. 2 shows a cross-sectional view through a non-return valve inserted into a cylinder head cover.
Figure 3:
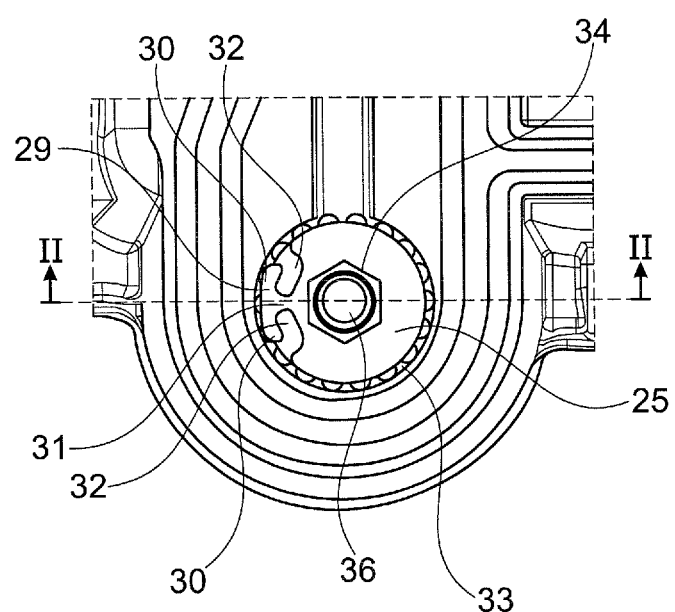
FIG. 3 shows a top view of the non-return valve from FIG. 2.
Figure 5:
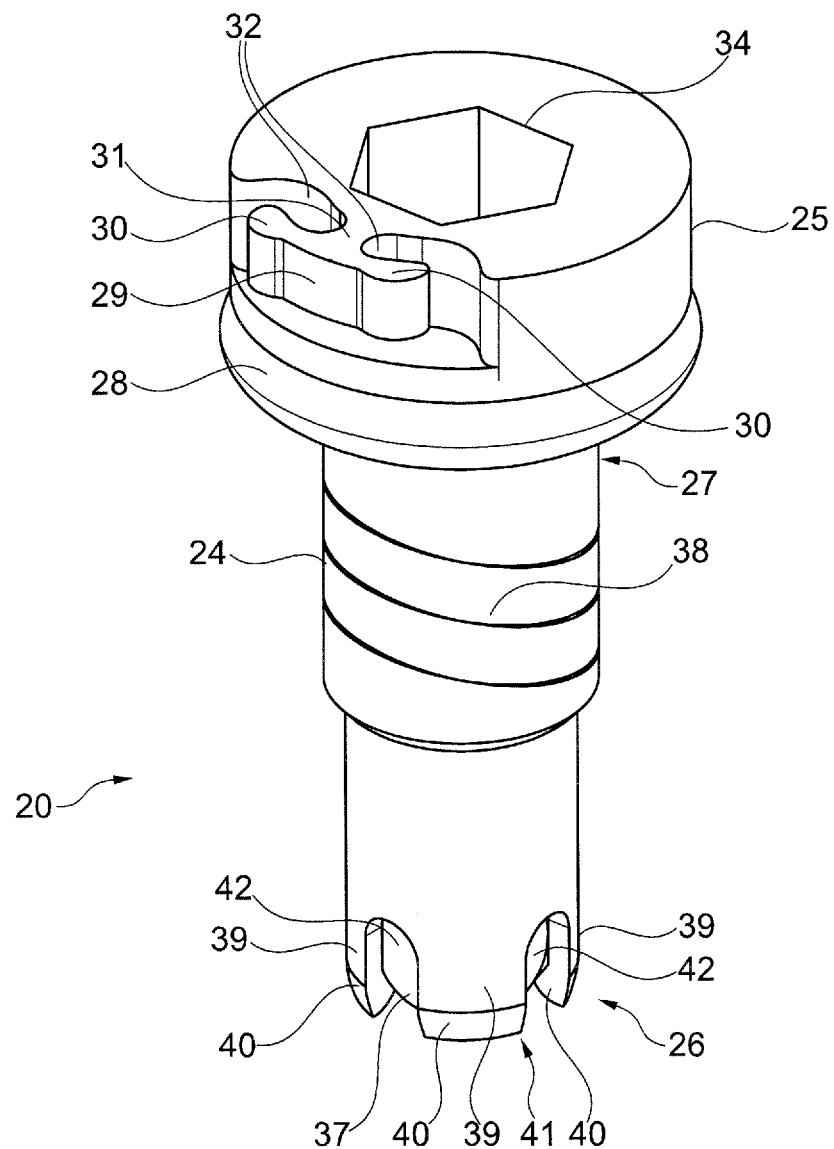
FIG. 5 shows a perspective view of a non-return valve.

A non-return valve 20, which is illustrated in more detail in FIGS. 2 et seqq., is arranged in the oil return 17. The non-return valve 20 preferably is located in the oil discharge opening 15 which thus forms a mounting for the non-return valve 20. It includes a valve housing 27 with a shaft 24, a head 25 located at one end of the shaft 24, and an end portion 26 located at the other end of the shaft 24. A screw thread 38 is provided on the outer surface of the shaft 24 (see FIG. 5), which interacts with a corresponding screw thread on the inner surface of the oil discharge opening 15.

The non-return valve 20 comprises an axial through bore 36 extending through the entire valve housing 27, i.e. from the valve head 25 through the shaft 24 up to the end portion 26. The non-return valve 20 further comprises a valve body 37 which can be displaced between an open position and a closed position, as will be described in more detail in the following. In the open position, the valve body 37 allows the discharge of oil from the oil separator chamber 22 or the oil accumulation chamber 14 through the non-return valve or the through bore 36 to the crankcase side 16 to finally arrive in the oil pan of the crankcase. In case of an overpressure at the crankcase side 16 of the non-return valve 20 relative to the separator chamber 22, the valve body 37 is moved to the closed position to prevent an unintentional transport of oil from the crankcase into the cleanroom 21 through the oil discharge opening 15 against the oil discharge direction.

For being mounted the non-return valve 20 is screwed into the oil discharge opening or mounting 15 from above, i.e. from the side of the oil separator 13, until the head 25 abuts against the housing part 18 forming the mounting 15. For this purpose, a tool-receiving socket 34 for receiving a tool, for example a hex key, can be provided in the valve head 25.

The sealing between the valve housing 27 and the housing part 18 forming the mounting 15 here is effected by use of a sealing ring 28 which for example is located on the valve head 25, whereas it is also possible to locate the same in the area of the shaft 24. The sealing between the valve housing 27 and the housing part 18 can alternatively also be realized by a gap-free seat of the valve housing 27 or the valve head 25 on the housing part 18. In this case, a separate sealing element can be omitted.

Figure 4:
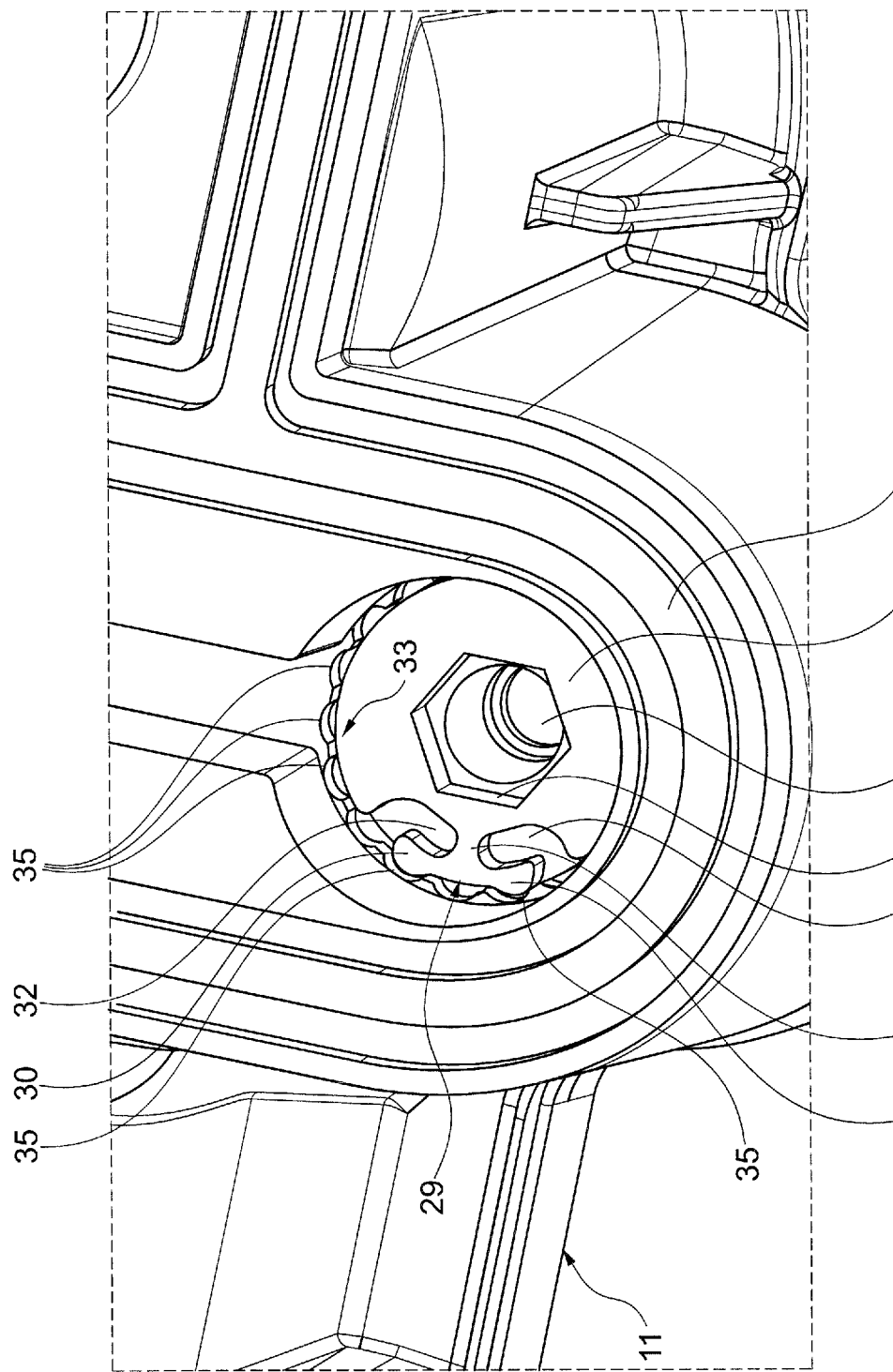
FIG. 4 shows a perspective top view of a non-return valve inserted into a cylinder head cover.

A latch means 29 is provided on the valve head 25, preferably on its circumferential surface. The latch means 29 here includes two latch fingers 30 which are mounted in an elastically resilient manner on the valve head 25 via a web 31. When the valve housing 27 is screwed into the mounting 15, the latch fingers 30 get in contact with a circumferential wall of the mounting 15 and are pressed towards the valve head 25 into corresponding recesses 32 between the latch fingers 30 and the valve head 25. On the circumferential wall of the mounting 15, a notched structure 33 with notch recesses 35 (see FIG. 4) distributed over the circumference is preferably provided. When the valve housing 27 is inserted into the mounting 15 completely, the latch fingers 30 engage into corresponding notch recesses 35, see FIG. 4, whereas rattling forces occurring during operation do not suffice to disengage the latch fingers 30 from the notch recesses 35 against the resilient force. The non-return valve 10 thus is reliably mounted in the mounting 15 by the latch means 29, 33, 35.

By applying a detaching force in the detaching direction, for example by use of a tool inserted into the tool-receiving socket 34, the valve housing 27 can be unscrewed from the mounting 15, whereby the latching force between the latch means 29, 33, 35 is overcome. The valve housing 27 thus advantageously is detachably latched or mounted in the mounting 15. Embodiments in which the valve housing 27 is non-detachably latched or mounted in the mounting 15, for example by use of a snap-in latch means acting in the circumferential direction, are also possible.

At its end portion 26, the valve housing comprises a plurality of axial bars 39 spaced from one another between which the valve body is mounted so as to be axially displaceable. The bars 39 thus form an axial guidance for the valve body 37. In the mounted state of the valve 20, the end portion 26 of the valve 20 and the bars 39 advantageously may protrude completely beyond the housing part 18 and then extend freely into the crankcase side chamber 16, as can be best identified in FIG. 2. However, this is not mandatory at all. In other embodiments, the end portion 26 does not protrude as described above to advantageously be protected against external manipulations, for example during the assembly, or against splash oil.

At their free ends, the bars 39 comprise inward-bent extensions 40 forming a seat 41 for the valve body 37 in the non-operating state of the engine. In the non-operating state of the engine, the valve body 37 being subject to gravity rests on the extensions 40 or the valve seat 41 and uncovers a maximum flow diameter for the discharging oil through the openings 42 between the bars 39. Thus, it is secured that the oil accumulated in the oil separator chamber 22 or the oil accumulation chamber 14 essentially can discharge completely in the non-operating state of the engine, whereby the risk of the valve 20 to freeze can be reduced significantly.

If the pressure at the crankcase side 16 of the valve 20 exceeds the pressure in the oil separator chamber 22 to such an extent that the compressive force acting on the valve body 37 exceeds its weight force, the valve body 37 is lifted by the compressive force and is displaced axially, until the valve body 37 rests against an upper ring-shaped valve seat 43 (see FIG. 2), which advantageously is formed in the shaft 24. The valve seat 43 for example can be formed by an upward-tapering cone-shaped inner surface of the shaft 24. The through opening enclosed by the upper valve seat 43 is part of the through bore 36.

In the closed position, in which the valve body 37 rests against the upper valve seat 43, the through bore 36 is covered by the valve body 37 and the ingress of oil-loaded gas from the crankcase into the oil separator chamber 22 or the cleanroom 21 is prevented.

The valve 20 features exactly two positions of the valve body 37 which in particular are defined by abutments, i.e. the open position with maximum oil flow diameter and the closed position. At any constant relative pressure between the crankcase side 16 and the oil separator chamber 22, the valve body 37 can take the open position or the closed position only, but no other position. If there is no difference in pressure, the valve body 37 is in the open position.

According to the above, the oil discharge valve 20 is operated by gravity and difference in pressure between the crankcase side 16 and the oil separator chamber 22 only, i.e. without external power. The valve 20 thus advantageously is uncontrolled, non-magnetic and non-electric. The valve also is not a float valve, as the fluid level in the oil accumulation chamber 14 does not have any effect on the valve body 37.

Figure 6:
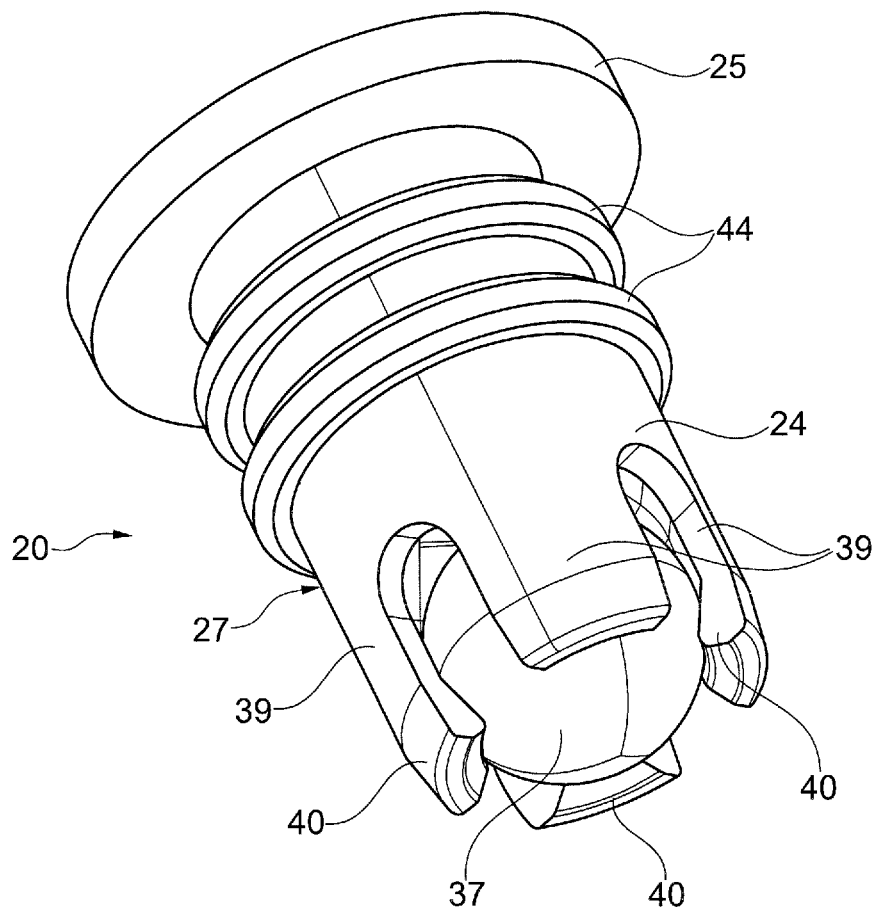
FIG. 6 shows a perspective view of another embodiment of a non-return valve.

Other connections than the connection between the valve housing 27 and the mounting 15 are possible. For example in the embodiment according to FIG. 6, the valve housing 27 can be fittingly inserted into the mounting 15 of the housing 11. The shaft 24 here does not comprise a screw thread 38, however advantageously one or more clamping elements 44, here two axially spaced clamping rings which may be integrally-formed to the outer circumference of the shaft and may have a slight oversize with respect to the mounting 15. The clamping element 44 advantageously may comprise an elastomer coating or may be made of an elastomer with which flexibility during insertion as well as a sealing effect can be realized.

Figure 7:
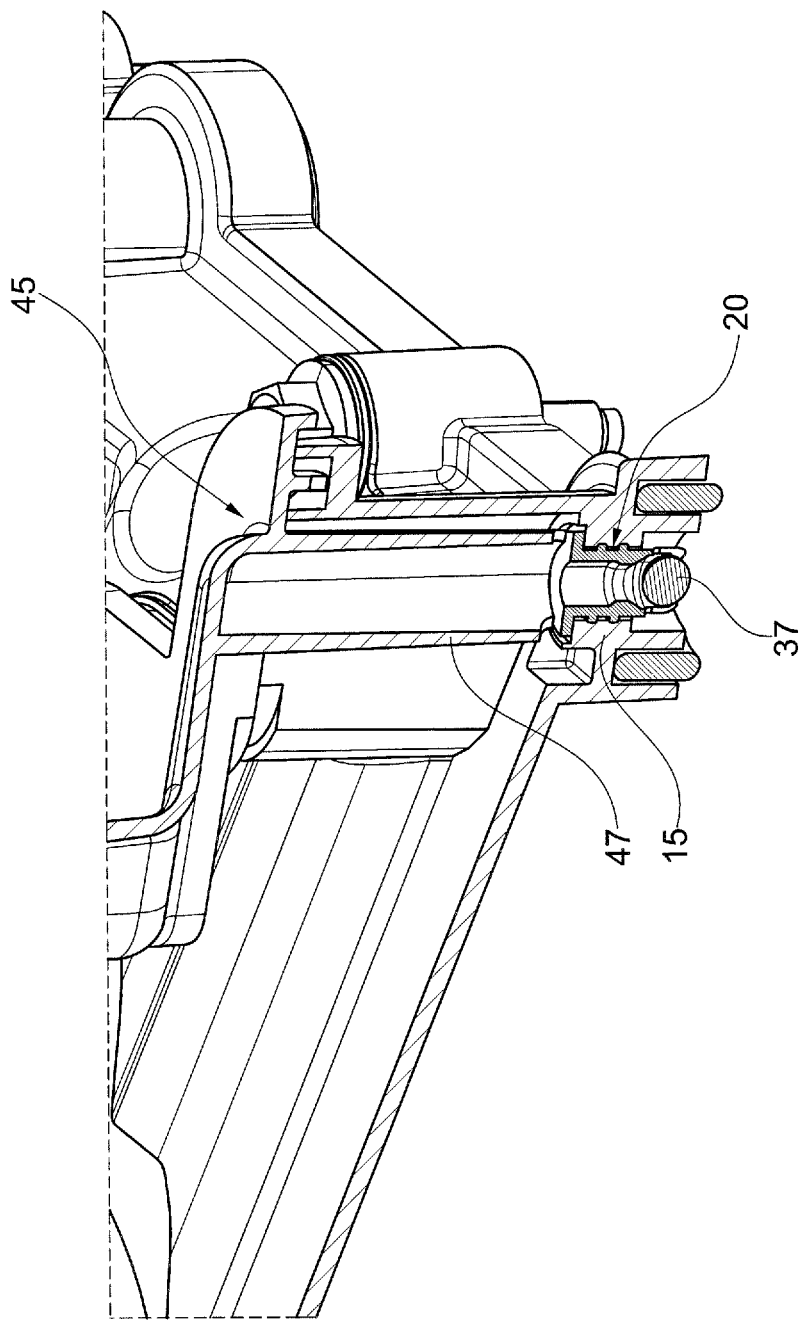
FIG. 7 shows a perspective view of a cylinder head cover with an inserted non-return valve according to FIG. 6.

To prevent the valve 20 from moving out of the mounting 15 for example being subject to vibrations, an axially acting latch means, for example a snap-in latch means, can be provided between the valve housing 27 and the mounting 15. Alternatively, a component 45 of the cylinder head cover 10 can comprise a securing means 47 which during operation is located above the valve head 25 at a small distance (see FIG. 7) so that the valve housing 27 in the event of moving out of the mounting 15 abuts against the securing means 47. The component 45 is mounted after the insertion of the valve 20 into the mounting 15. In the embodiment according to FIG. 1, a pin, a shoulder or a similar securing means can be provided for example on the rear side of the lid 19, which after the mounting of the lid 19 is located at a small distance from the upper surface of the valve head 25. The component 45 bearing the securing means 47 is not limited to the housing lid 19 or other housing parts. It may for example also be a part of the oil separator 13 or an oil carrying device 45 (see FIG. 7).

Embodiments

Embodiment 1. A non-return valve for an oil return in the crankcase ventilation system of a combustion engine, including:

a valve housing;

a valve body which is mounted in the valve housing so as to be displaceable as a whole between an open position and a closed position;

the valve body in the non-operating state of the combustion engine is maintained in the open position without preload;

the valve body is configured to automatically move to the closed position in case of an overpressure at the crankcase side with respect to the oil separator chamber;

wherein the non-return valve is provided and configured to be inserted into a mounting of a cylinder head cover of the combustion engine.

Embodiment 2. The non-return valve according to Embodiment 1, wherein the valve housing comprises threaded means for being screwed into the mounting of the cylinder head cover.

Embodiment 3. The non-return valve according to Embodiment 1, wherein the non-return valve includes a latch means acting between the valve body and the valve housing.

Embodiment 4. The non-return valve according to Embodiment 1, wherein the valve housing can be fittingly inserted into the mounting of the cylinder head cover.

Embodiment 5. The non-return valve according to Embodiment 1, wherein the valve housing is configured to establish a clamping connection with the mounting of the cylinder head cover.

Embodiment 6. The non-return valve according to Embodiment 1, wherein the valve housing comprises latch means for latching the valve housing in the mounting of the cylinder head cover.

Embodiment 7. The non-return valve according to Embodiment 6, wherein the latch means includes at least one latch finger mounted in an elastically resilient manner on the valve head, which finger is pressed into a recess between the latch finger and the valve head when the valve housing is inserted into the mounting.

Embodiment 8. The non-return valve according to Embodiment 1, wherein the valve body is ball-shaped or spherical.

Embodiment 9. The non-return valve according to Embodiment 1, wherein the valve housing at its end portion comprises a plurality of axial bars spaced from one another, between which the valve body is mounted so as to be axially displaceable.

Embodiment 10. The non-return valve according to Embodiment 9, wherein the bars form a seat for the valve body in the non-operating state of the engine.

Embodiment 11. A cylinder head cover for a combustion engine, including an oil separator and an oil return for returning separated oil into an oil pan, wherein a non-return valve is located in the oil return, the non-return valve including:
  a valve housing;
  a valve body which is mounted in the valve housing so as to be displaceable as a whole between an open position and a closed position;
  the valve body in the non-operating state of the combustion engine is maintained in the open position without preload;
  the valve body is configured to automatically move to the closed position in case of an overpressure at the crankcase side with respect to the oil separator chamber;
  wherein the non-return valve is provided and configured to be inserted into a mounting of a cylinder head cover of the combustion engine.

Embodiment 12. The cylinder head cover according to Embodiment 11, wherein the cylinder head cover comprises a housing opening which can be closed by a lid, through which opening the non-return valve can be inserted into a mounting provided in the cylinder head cover.

Embodiment 13. The cylinder head cover according to Embodiment 11 or 12, wherein a securing means is provided on a component of the cylinder head cover, which, when the component is mounted, is located relative to the valve housing such that upon a detaching movement of the valve housing the same abuts against the securing means.

Embodiment 14. The cylinder head cover according to Embodiment 11 or 12, wherein a notched structure with notch recesses distributed over the circumference is provided on an inner surface of the mounting.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A non-return valve, comprising:
   a valve housing,
     wherein the valve housing has a throughbore having a first end opening and a second end opening; and
   a valve body,
     wherein the valve body is movably mounted in the valve housing such that the valve body transitions between an open position and a closed position,
     wherein in the open position, fluids are able to pass from the first end opening to the second end opening and fluids are able to pass from the second end opening to the first end opening,
     wherein in the closed position, fluids are not able to pass from the first end opening to the second end opening and fluids are not able to pass from the second end opening to the first end opening,
   wherein the valve housing and the valve body are configured such that when the valve housing is positioned such that the first end opening is above the second end opening with respect to gravity:
     (i) the valve body automatically transitions to, or remains in, the closed position when a second pressure at the second end opening is greater than a first pressure at the first end opening by at least a threshold pressure difference; and
     (ii) the valve body automatically transitions to, or remains in, the open position when the second pressure is not greater than the first pressure by at least the threshold pressure difference,
   wherein the non-return valve is configured to be inserted into a mounting of a cylinder head cover of a combustion engine,
   wherein the valve housing comprises a threaded section,
   wherein the valve housing is configured to be screwed into the mounting of the cylinder head cover such that the threaded section threadably interconnects with a complementary threaded section of the mounting,
   wherein the valve housing comprises a latch,
   wherein when the valve housing is screwed into the mounting the latch interconnects with the mounting to secure the valve housing in the mounting of the cylinder head cover,
   wherein the valve housing comprises a valve head,
   wherein the latch includes at least one latch finger mounted in an elastically resilient manner on the valve head, and
   wherein when the valve housing is screwed into the mounting the at least one latch finger is pressed into one or more recesses between the at least one latch finger and the valve head.

2. The non-return valve according to claim 1, wherein the valve body is spherical.

3. The non-return valve according to claim 1, wherein the valve housing comprises a plurality of axial bars proximate the second end opening, and wherein the plurality of axial bars are spaced from one another, wherein when the valve body is in the open position at least a portion of the valve body is positioned between the plurality of axial bars.

4. The non-return valve according to claim 3, wherein the plurality of axial bars form a seat for the valve body when the valve body is in the open position.

5. A cylinder head cover for a combustion engine, comprising:
   an oil separator;
   an oil return,
     wherein the oil return returns separated oil to an oil pan;
   a mounting; and
   a non-return valve,
     wherein the non-return valve comprises:
       a valve housing,
         wherein the valve housing has a throughbore having a first end opening and a second end opening; and
       a valve body,
         wherein the valve body is movably mounted in the valve housing such that the valve body transitions between an open position and a closed position, wherein in the open position, fluids are able to pass from the first end opening to the second end opening and fluids are able to pass from the second end opening to the first end opening, wherein in the closed position, fluids are not able to pass from the first end opening to the second end opening and fluids are not able to pass from the second end opening to the first end opening;

wherein the valve housing and the valve body are configured such that when the valve housing is positioned such that the first end opening is above the second end opening with respect to gravity:
  (i) the valve body automatically transitions to, or remains in, the closed position when a second pressure at the second end opening is greater than a first pressure at the first end opening by at least a threshold pressure difference; and
  (ii) the valve body automatically transitions to, or remains in, the open position when the second pressure is not greater than the first pressure by at least the threshold pressure difference, wherein the non-return valve is configured to be inserted into a mounting of a cylinder head cover of a combustion engine, wherein the valve housing comprises a threaded section, wherein the valve housing is configured to be screwed into the mounting of the cylinder head cover such that the threaded section threadably interconnects with a complementary threaded section of the mounting, wherein the valve housing comprises a latch, wherein when the valve housing is screwed into the mounting the latch interconnects with the mounting to secure the valve housing in the mounting of the cylinder head cover, wherein the valve housing comprises a valve head, wherein the latch includes at least one latch finger mounted in an elastically resilient manner on the valve head, wherein when the valve housing is screwed into the mounting the at least one latch finger is pressed into one or more recesses between the at least one latch finger and the valve head, wherein the non-return valve is configured to be inserted into the mounting such that when the non-return valve is inserted into the mounting separated oil enters the first end opening, and wherein when the valve body is in the open position the separated oil that enters the first end opening passes from the first end opening to the second end opening and returns to the oil pan.

6. The cylinder head cover according to claim 5, further comprising:
a housing,
wherein the housing comprises an opening, and
wherein the non-return valve is configured to be inserted through the opening and inserted into the mounting.

7. The cylinder head cover according to claim 6, further comprising:
a lid,
wherein the lid is configured to close the opening or open the opening.

8. The cylinder head cover according to claim 6, further comprising:
a securing surface,
wherein when the non-return valve is inserted into the mounting the securing surface is located relative to the valve housing such that upon a movement of the valve housing tending to separate the valve housing from the mounting, the valve housing abuts against the securing surface and prevents the valve housing from separating from the mounting.

9. The cylinder head cover according to claim 5, further comprising:
a securing surface,
wherein when the non-return valve is inserted into the mounting the securing surface is located relative to the valve housing such that upon a movement of the valve housing tending to separate the valve housing from the mounting, the valve housing abuts against the securing surface and prevents the valve housing from separating from the mounting.

10. The cylinder head cover according to claim 5,
wherein the mounting comprises a notched structure having notch recesses into an inner surface of the mounting and distributed over a circumference of the mounting.

11. The cylinder head cover according to claim 5,
wherein the second end opening opens to a crankcase of the combustion engine, and
wherein the non-return valve prevents oil from returning to the oil separator.

12. The cylinder head cover according to claim 5,
wherein the valve body is spherical.

13. The cylinder head cover according to claim 5,
wherein the valve housing comprises a plurality of axial bars proximate the second end opening, and
wherein the plurality of axial bars are spaced from one another, wherein when the valve body is in the open position at least a portion of the valve body is positioned between the plurality of axial bars.

14. The cylinder head cover according to claim 13,
wherein the plurality of axial bars form a seat for the valve body when the valve body is in the open position.

15. A method of returning separated oil in the crankcase ventilation system of a combustion engine, comprising:
positioning a non-return valve such that the non-return valve receives separated oil from an oil separator of a combustion engine,
wherein the non-return valve comprises:
  a valve housing,
    wherein the valve housing has a throughbore having a first end opening and a second end opening; and
  a valve body,
    wherein the valve body is movably mounted in the valve housing such that the valve body transitions between an open position and a closed position,
    wherein in the open position, fluids are able to pass from the first end opening to the second end opening and fluids are able to pass from the second end opening to the first end opening,
    wherein in the closed position, fluids are not able to pass from the first end opening to the second end opening and fluids are not able to pass from the second end opening to the first end opening;
    wherein the valve housing and the valve body are configured such that when the valve housing is positioned such that the first opening is above the second end opening with respect to gravity:
      (i) the valve body automatically transitions to, or remains in, the closed position when a second pressure at the second end opening is greater than a first pressure at the first end opening by at least a threshold pressure difference; and
      (ii) the valve body automatically transitions to, or remains in, the open position when the second pressure is not greater than the first pressure by at least the threshold pressure difference, wherein the non-return valve is configured to be inserted into a mounting of a cylinder head cover of the combustion engine, wherein the valve housing comprises a threaded section, wherein the valve housing is configured to be screwed into the mounting of the cylinder head cover such that the threaded section threadably interconnects with a complementary threaded section of the mounting, wherein the valve housing comprises a latch, wherein when the valve housing is screwed into the mounting the latch interconnects with the mounting to secure the valve housing, in the mounting of the cylinder head cover, wherein the valve housing comprises a valve head, wherein the latch includes at least one latch finger mounted in an elastically resilient manner on the valve head, and wherein when the valve housing is screwed into the mounting the at least one latch finger is pressed into one or more recesses between the at least one latch finger and the valve head; and operating the combustion engine such that the first end opening is higher than the second end opening with respect to gravity.

16. The method according to claim 15,
wherein positioning the non-return valve comprises inserting the non-return valve into the mounting of the cylinder head of the combustion engine such that oil from the oil separator enters the first end opening, and
wherein when the valve body is in the open position the separated oil that enters the first end opening passes from the first end opening to the second end opening and returns to the oil pan.

17. The method according to claim 15,
wherein the second end opening opens to a crankcase of the combustion engine, and
wherein the non-return valve prevents oil from returning to the oil separator.

18. The method according to claim 15,
wherein the valve body is spherical.

19. The method according to claim 15,
wherein the valve housing comprises a plurality of axial bars proximate the second end opening, and
wherein the plurality of axial bars are spaced from one another, wherein when the valve body is in the open position at least a portion of the valve body is positioned between the plurality of axial bars.

20. The method according to claim 19,
wherein the plurality of axial bars form a seat for the valve body when the valve body is in the open position.

* * * * *